(12) United States Patent
Singh et al.

(10) Patent No.: US 8,548,835 B2
(45) Date of Patent: Oct. 1, 2013

(54) MODELING TOOL FOR DETERMINING AN ORGANIZATION'S SUPPLY CHAIN EMISSIONS FOOTPRINT

(75) Inventors: Amit K. Singh, Fremont, CA (US); Udo Waibel, Los Altos, CA (US)

(73) Assignee: Hara Software, Inc., San Mateo, CA (US)

( * ) Notice: Subject to any disclaimer, the term of this patent is extended or adjusted under 35 U.S.C. 154(b) by 210 days.

(21) Appl. No.: 12/860,845

(22) Filed: Aug. 20, 2010

(65) Prior Publication Data
US 2011/0119114 A1    May 19, 2011

(51) Int. Cl.
*G06Q 10/00*    (2012.01)
(52) U.S. Cl.
USPC ....................................................... 705/7.11
(58) Field of Classification Search
USPC ....................................................... 705/7.11
See application file for complete search history.

(56) References Cited

U.S. PATENT DOCUMENTS

| | | | | |
|---|---|---|---|---|
| 7,742,830 | B1 * | 6/2010 | Botes | 700/32 |
| 8,321,234 | B2 * | 11/2012 | Ohnemus et al. | 705/1.1 |
| 8,346,595 | B2 * | 1/2013 | Ben-Hamida et al. | 705/7.35 |
| 2008/0072232 | A1 * | 3/2008 | O'Toole, Jr. | 718/104 |

OTHER PUBLICATIONS

Kindermann et al (Global cost estimates of reducing carbon emissions through avoided deforestation), Jul. 29, 2008, www.pnas.org/cgi/doi/10.1073/pnas.0710616105, pp. 10302-10307.*
Weisser "A guide to life-cycle greenhouse gas (GHG) emissions from electric supply technologies", May 2006, Planning and Economics Studies Section, International Atomic Energy Agency, Wagramer Strasse 5, 1400 Vienna, Austria, Pages.*

* cited by examiner

*Primary Examiner* — Romain Jeanty
(74) *Attorney, Agent, or Firm* — Patent Law Group LLP; David C. Hsia

(57) ABSTRACT

A CO2e modeling system is implemented via a host server that is remotely accessible by a large number of clients (organizations) and suppliers of goods and services to the clients. The host server accesses a database containing CO2e emission-related data from a large number of suppliers. The client, when determining their indirect CO2e emissions resulting from their supply chain network, then identifies to the host server, via the web, the various suppliers used by the client and the client's amount of usage of the various suppliers. The host server uses its stored conversion factors and other data from the database to calculate the client's indirect CO2e emissions as a result of the client's usage of the particular suppliers. The server may calculate the total CO2e emissions generated by the entire chain of suppliers that are involved with providing a particular product to the client.

18 Claims, 4 Drawing Sheets

Client Y Usage of Suppliers

| | |
|---|---|
| Supplier Name | |
| Time Frame | |
| Quantity of product X | |
| Amounts paid | |
| etc. | |

Fig. 3

Organization X Data for Calculating Attribution (2009-2010)

| | |
|---|---|
| Time Frame | |
| Revenue | |
| Total output of product X | |
| Total mileage traveled | |
| Total costs | |
| etc. | |

Fig. 4

$CO_2e$ Emission By Supply Chain for Goods/Services X

| | |
|---|---|
| Time Frame | |
| Supplier A $CO_2e$ emission attributed to client for goods/services X | |
| Supplier B $CO_2e$ emission… | |
| Supplier C $CO_2e$ emission… | |
| etc. | |
| Total $CO_2e$ emission from supply chain network attributed to client for goods/services X | |

Fig. 6

Consumptions for Organization X

Natural Gas

| From Date | [ ] | To Date | [ ] | Description |
| Amount | [ ] therms | Cost | [ ] | [ ] |

Electricity

| From Date | [ ] | To Date | [ ] | Description |
| Amount | [ ] kwhs | Cost | [ ] | [ ] |

Gasoline

| From Date | [ ] | To Date | [ ] | Description |
| Amount | [ ] therms | Cost | [ ] | [ ] |

Water

| From Date | [ ] | To Date | [ ] | Description |
| Amount | [ ] gallons | Cost | [ ] | [ ] |

Fig. 5

MODELING TOOL FOR DETERMINING AN ORGANIZATION'S SUPPLY CHAIN EMISSIONS FOOTPRINT

FIELD OF THE INVENTION

The present invention relates to the field of carbon emissions management, primarily represented in terms of greenhouse gas (GHG) emissions management. More specifically, the invention relates to a modeling method, performed by a processing system, that determines an organization's supply chain-related indirect carbon equivalent emissions.

BACKGROUND

"Emissions" refer to the introduction of chemicals, particulate matter, or biological materials into the atmosphere, ground, or water system that potentially can cause harm or discomfort to humans or other living organisms, or may damage the natural environment.

GHG is a collective term for gases such as carbon dioxide, methane, HFCs, SF6, and nitrous oxide that trap heat in the atmosphere and contribute to climate change. GHG accounting and reporting is the discipline of tracking GHGs produced as a result of executing business processes, including manufacturing, travel, keeping of livestock, etc.

The term "carbon dioxide equivalent" (CO2e) is a common normalized unit of measurement, such as expressed in tonnes of CO2e, that is used to compare the relative climate impact of the different GHGs. The CO2e quantity of any GHG is the amount of carbon dioxide that would produce the equivalent global warming potential. There are publicly accepted factors that are used to convert an entity's emissions, usage of resources (e.g., electricity, gas, oil, coal, etc.), or waste products, among other things, into a CO2e emission.

An organization, such as a company or other entity, may want to, or be required to, reduce their CO2e emissions. For example, a company's CO2e emissions per year, either overall or for targeted activities, may be capped by a governmental or industrial organization.

Although an organization can measure or calculate the CO2e emissions directly generated by the organization, such as by direct physical measurement or multiplying its own kwh or gas usage by an accepted conversion factor, the organization is not able to determine the CO2e emissions that are generated by its suppliers of goods and services as a direct consequence of the organization. Such information would be valuable to a socially conscience organization concerned with reducing CO2e on a global scale.

SUMMARY

In one embodiment, a modeling system is implemented via a host server that is accessible by a large number of clients (organizations) using a website. In the example given herein, it is assumed a client wishes to reduce its direct and indirect CO2e emissions.

The host server accesses a database containing CO2e emission-related data from a large number of suppliers of goods and services. In one example, when appropriate for certain suppliers, the database identifies the CO2e emissions generated by a supplier per year and the total quantity of products produced by the supplier, so the CO2e emissions per unit product can be calculated. In another example, the database may identify the average CO2e emission generated by each delivery of goods. The types of data needed to calculate CO2e emissions would be particular to the type of supplier. The database may also store conversion factors for calculating the CO2e emission per unit output from a supplier. The database may also store the various suppliers' relationships with each other so that a supply chain network for a particular client can be determined. A subset of the suppliers identified in the database would be used by each client. The database will typically obtain the suppliers' information from the various suppliers inputting the information into the host server via the web. The data is held private in the database.

The client, when determining their indirect CO2e emissions resulting from their supply chain network, then identifies to the host server, via the web, one or more suppliers used by the client and the client's amount of usage of the various suppliers. The host server obtains the necessary supplier data from the database and calculates the client's indirect CO2e emissions as a result of the client using the particular suppliers.

Although, the client may identify a particular primary supplier that deals directly with the client, the host server may also identify all secondary suppliers that support the primary supplier. The server may calculate the total CO2e emissions generated by the entire chain of suppliers that is involved with providing a particular product to the client. In an example of the client determining its indirect CO2e emissions generated as a result of the client using one million sheets of paper per year, the host server may calculate the CO2e emissions generated by the lumber supplier, the mill, the paper manufacturer, and the delivery service for providing the one million sheets of paper.

In another example, if the host server determines that the client uses an equivalent of 10% of a particular supplier's services for one year, the indirect CO2e emissions by the client due to the services are 10% of the supplier's total CO2e emissions for that year. This same calculation is performed for all the suppliers in the supply chain to derive the total CO2e emissions generated for each service performed for the client.

In one embodiment, the client licenses the full modeling tool from the host company, and the suppliers are only given a limited license to enter data that can be used to calculate the clients' indirect CO2e emissions due to the supply chain network.

The result is then displayed to the client in any suitable format. The client may then select different suppliers and/or usages to compare the CO2e emissions. Since a client will want to use those suppliers generating low CO2e emissions, the suppliers will be financially motivated to reduce their CO2e emissions. In this way, the client can reduce its indirect CO2e emissions.

This modeling technique can also be applied to resource usage, such as energy usage, water usage, costs, etc., and to any type of emission, such as gas, solid waste, liquid waste, etc.

BRIEF DESCRIPTION OF THE DRAWINGS

FIG. 3 illustrates a simplified portion of the website display presented to a client in order for the client to identify its suppliers and its usage of the suppliers.

FIG. 4 illustrates a simplified portion of the website display presented to a supplier in order for the server to identify attribution of the supplier's CO2e emissions to a client using the supplier.

FIG. 5 illustrates a simplified portion of the website display presented to a supplier to identify the consumption of various resources by the supplier in order for the server to calculate the supplier's CO2e emissions.

FIG. 6 illustrates a simplified portion of the website display presented to a client identifying each supplier's CO2e emissions attributed to the client for particular goods or services and the total CO2e emissions from the supply chain network attributed to the client.

DETAILED DESCRIPTION

Figure 1:
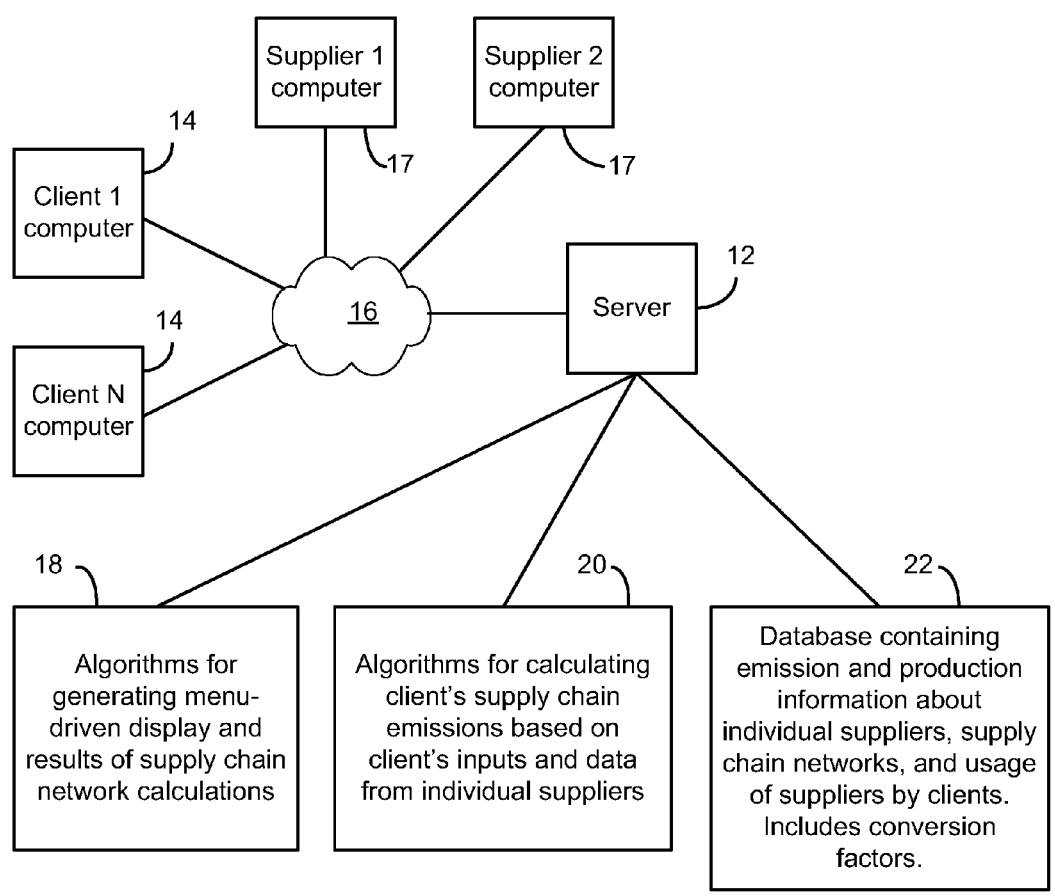
FIG. 1 schematically illustrates the centralized modeling system in accordance with one embodiment of the invention.

FIG. 1 illustrates the web-based centralized modeling system. A server 12, which may be managed by the host organization, provides a website that interfaces with the various clients (organizations) to allow the clients to upload data to the server 12, view information generated by the server 12 relating to the modeling, and allow the client to interact with the displayed information to develop emission reduction strategies. The server 12 and the clients' computers 14 communicate via a computer network, such as the Internet 16. Similarly, suppliers for the clients communicate with the server 12 via the Internet 16 using the suppliers' own computers 17. A client or supplier accesses its account using passwords or other privacy methods.

Although the server 12 has many functions, and there may be a plurality of servers, only one server and its software routines related to the present invention are illustrated. The programs illustrated are algorithms 18 and 20. The algorithms 18 are for generating the menu-driven display (and related display functions) and displaying the results of the supply chain network calculations. Any form of presentation (e.g., charts) may be used. The algorithms 20 are for performing the calculations, using the client data and supplier data, needed to determine the CO2e emissions generated by the client's supply chain network.

The software run by the server 12 can be divided into various modules or software tools including: 1) the tool that is used by the client for entering client-specific information such as the client's extent of usage of a particular supplier; 2) the tool that is used by each of the suppliers in the client's supply chain to identify their particular usages of resources to determine their individual CO2e emissions attributable to the client; 3) the tool that performs the various calculations and conversions for determining the total CO2e and individual CO2e's in the supply chain network; and 4) the tools that comprise the various display algorithms and communication algorithms.

The client can select the particular modeling information to be displayed on the website. The database 22 stores all information obtained from the various suppliers that is used to derive the CO2e emissions generated for particular usages of the suppliers in a supply chain network. In an actual embodiment, data from thousands of suppliers would be stored in the database 22. The suppliers are motivated to input their information in order for clients to determine the supplier's CO2e emissions.

In one embodiment, each client licenses the full modeling tool from the host organization, and the clients' suppliers are only given a limited license to enter data that can be used to calculate the clients' indirect CO2e emissions due to the supply chain. Each client may identify its suppliers to the host server in order for the suppliers to receive a limited license to access the modeling tool. The limited license also extends to all secondary suppliers that provide goods and services to the primary supplier. Such secondary suppliers may be identified by the primary suppliers, since the clients typically are aware of only their primary suppliers.

The term supply chain may be considered a value chain since it applies to suppliers of any goods and services that ultimately result in goods and services being provided to the client.

Figure 2:
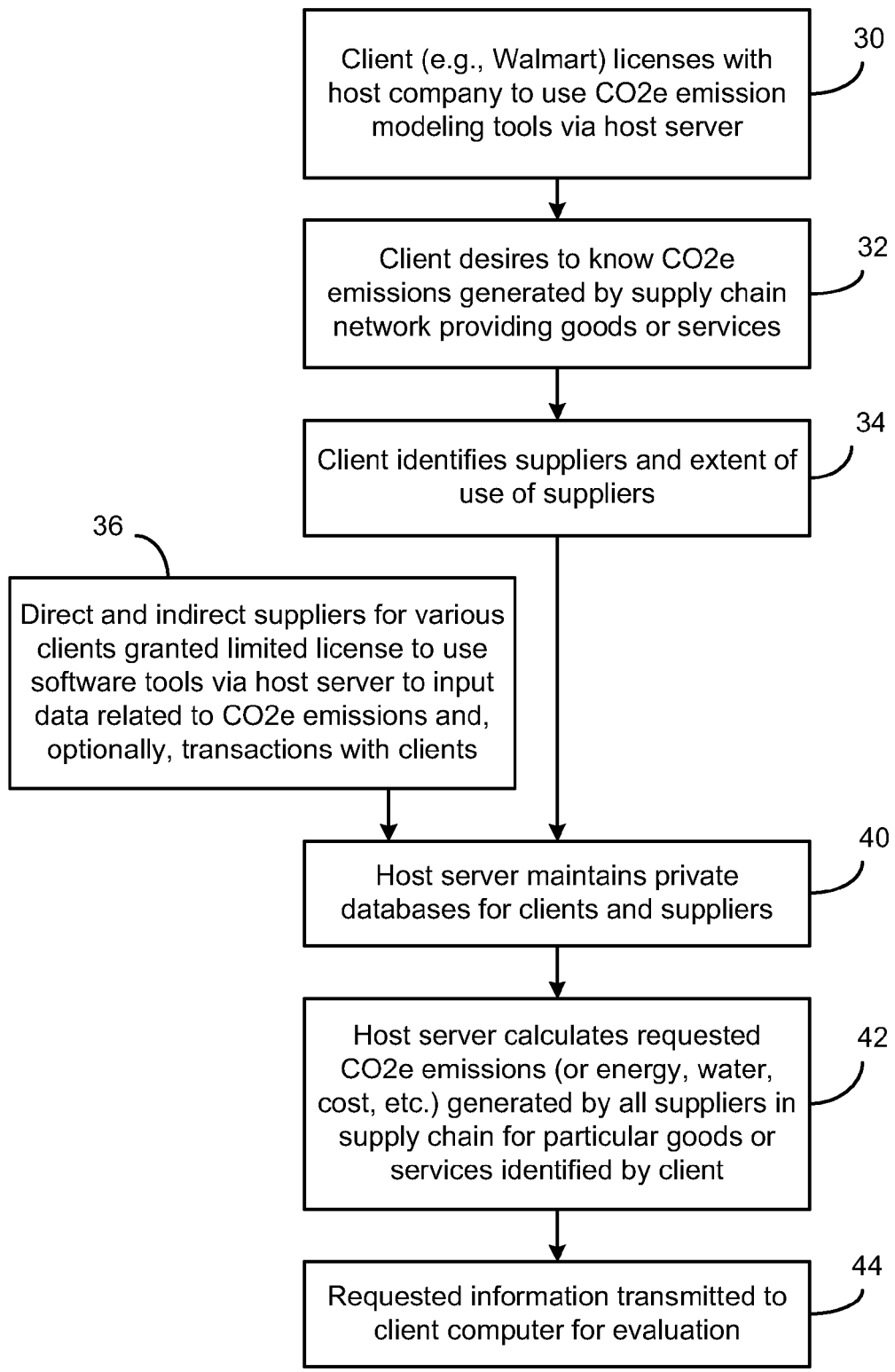
FIG. 2 is a flowchart of one example of a method performed by the clients, suppliers, and server.

FIG. 2 is a flowchart that will be used to explain the modeling example of FIGS. 3-6.

In step 30 of FIG. 2, it is assumed that a client, such as Walmart, licenses with the host organization to use the full complement of CO2e emission modeling tools via the host server 12. The modeling tools may also apply to resource usage, such as energy, water, cost, etc., or any type of emission (e.g., gas, waste, etc.), although the example is directed to the client desiring to determine the CO2e emissions by its supply chain network.

In step 32, it is assumed the client desires to use the modeling tools to know the CO2e emissions generated by its supply chain network for supplying particular goods or services to the client. The client may wish to evaluate such indirect CO2e emissions in order to select the most efficient (least polluting) suppliers.

In step 34, the client identifies, via the client's computer 14 and the server 12, the target supplier(s) and the extent of use of the supplier during a specified time period. The supplier may be the client's existing supplier or a supplier that the client is considering using.

FIG. 3 illustrates a simplified portion of the website display presented to a client in order for the client to identify its suppliers and its usage of the suppliers in step 34 for a specified period. Such information requested by the server 12 may include the supplier name, the time period of interest, the quantity of the target product purchased from the supplier, the amounts paid to the supplier, and other pertinent information to determine the client's actual or expected usage of a particular supplier.

In step 36, which may occur at any time, each supplier supported by the modeling system is granted a limited license to enter pertinent data into the database 22 that can be used by the server 12 to determine the supplier's CO2e emissions attributed to any client. All suppliers in a supply chain may enter pertinent data.

FIG. 4 illustrates a simplified portion of the website display presented to a supplier in order for the server 12 to identify attribution of the supplier's CO2e emissions to a client using the supplier. The information requested may include the time period, the revenue generated, the total output of certain products, the total mileage traveled using particular types of transportation, and any other pertinent information. The pertinent information may be dependent on the particular type of supplier. The information supplied by the suppliers may also include the percentage or absolute value of revenue, output, etc. attributed to particular clients.

FIG. 5 illustrates a simplified portion of the website display presented to a supplier to identify the consumption of various resources by the supplier in order for the server 12 to calculate the supplier's CO2e emissions and ultimately determine the percentage of the CO2e emissions attributed to a client using the supplier. In the example, the supplier identifies the time frame, the usage amount, the cost, and a description for resources including natural gas, electricity, gasoline, and water. The supplier may obtain such information from utility bills. An accepted CO2e conversion factor, which may be stored in the database 22, may be applied to most types of resource usages.

In step 40, the host server 12 maintains the data from the clients and suppliers separate and private in the database 22.

Although the raw data from each supplier may be kept private, the CO2e emissions by a supplier attributed to a client are made available to the client.

In step 42, the host server 12 applies the data in the database 22 to stored conversion factors and calculates the CO2e emissions by each supplier in the supply chain network, as well as the total CO2e emission, associated with supplying the goods or services of interest to the client. The server 12 uses the data in the database 22 to identify all the suppliers in a supply chain network used for providing particular goods or services to each client.

In step 44, the information requested by the client is transmitted to the client for viewing on the client's own computer 14.

FIG. 6 illustrates a simplified portion of the website display presented to a client identifying each supplier's CO2e emissions attributed to a client for particular goods or services and the total CO2e emissions by the supply chain network attributed to the client.

The client may select different suppliers in the modeling tool to determine the suppliers that create the lowest carbon footprint. This would motivate suppliers to reduce their carbon footprint. Also, the client may be required to know its indirect CO2e emissions for compliance with a regulation.

Many other types of displays and input techniques may be used instead of the simplified examples given herein.

The modeling method is based on the real world physical movement of goods in a supply chain. The model uses information and lessons learned from the physical supply chain world and allows sharing of the information between clients to determine their indirect carbon emissions from their supply chains. The modeling system uses processes and tools for a client to identify one or more suppliers and to identify an extent of usage of the supplier's services in a given period. The modeling system uses processes and tools for the suppliers themselves to manage and identify their emissions data (e.g., by identifying the supplier's usage of at least one resource and converting the usage into a CO2e) and transmit the data for use by the clients. Algorithms in the modeling system process the suppliers' data and the client's data to calculate a value related to a greenhouse gas emission by a supply chain (including an emission attributed to each supplier in the chain), based on the suppliers' usage of the at least one resource attributed to the client. The value is then transmitted to the client for evaluation by the client. The model promotes usage by the clients of supply chains with a low carbon footprint, which, in turn, promotes the suppliers to lower their carbon footprints.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

What is claimed is:

1. A method performed by at least one programmed server, the server being remotely accessed by client organizations and suppliers of goods or services for the client organizations, the method comprising:
   receiving first data by the server input by a client identifying a first supplier and an extent of usage of the first supplier;
   receiving second data by the server input by the first supplier identifying the first supplier's usage of at least one resource;
   retaining the first data and the second data in a database memory for access by the server;
   receiving third data by the server input by at least a second supplier, the third data identifying the at least the second supplier's usage of at least one resource, the first supplier and the at least the second supplier being in a supply chain that provides goods or services to the client;
   retaining the third data in the database memory for access by the server;
   calculating by the server a value related to a total greenhouse gas emission equivalent by the first supplier and the at least the second supplier attributed to the client's usage of the first supplier and the at least the second supplier; and
   transmitting the value related to the total greenhouse gas emission equivalent by the first supplier and the at least the second supplier to the client for evaluating by the client so that the client can determine a greenhouse gas emission equivalent by the supply chain.

2. The method of claim 1 wherein the step of receiving the first data by the server comprises receiving the first data sufficient to determine what percentage of the first supplier's total usage over a time period is attributable to the client.

3. The method of claim 1 wherein the step of receiving the first data by the server comprises receiving the first data sufficient to determine a greenhouse gas emission equivalent per unit of goods provided to the client by the first supplier.

4. The method of claim 1 wherein the step of receiving the first data by the server comprises receiving the first data sufficient to determine a greenhouse gas emission equivalent per unit of services provided to the client by the first supplier.

5. The method of claim 1 wherein the step of receiving the second data by the server comprises receiving the second data by the server input by the first supplier identifying the first supplier's usage of energy resources over a time period.

6. The method of claim 1 wherein the step of receiving the second data by the server comprises receiving the second data by the server input by the first supplier identifying the first supplier's usage of materials resources over a time period.

7. The method of claim 1 wherein the extent of usage of the first supplier is proposed.

8. The method of claim 1 wherein the extent of usage of the first supplier is actual.

9. A modeling system that models a greenhouse gas emission equivalent based on a supply of goods or services by a supply chain to a client, the system comprising at least one processor and software tools used by the at least one processor to perform modeling, the system comprising:
   first software tools to receive first data by the at least one processor input by a client identifying a first supplier and an extent of usage of the first supplier;
   second software tools to receive:
      second data, by the at least one processor, input by the first supplier identifying the first supplier's resource usage; and
      third data, by the at least one processor, input by at least a second supplier identifying the at least the second supplier's resource usage, the first supplier and the at least the second supplier being in the supply chain;
   a database memory to retain the first data, the second data, and the third data for access by the at least one processor;
   third software tools to calculate, by the at least one processor, a value related to a total greenhouse gas emission equivalent by the first supplier and the at least the second supplier attributed to the client's usage of the first supplier and the at least the second supplier; and fourth software tools to transmit the value related to the total greenhouse gas emission equivalent by the first supplier and the at least the second supplier to the client for evaluating by the client so that the client can determine a greenhouse gas emission equivalent by the supply chain.

10. The system of claim 9 wherein the second software tools have a limited capability compared to the first software tools in that the second software tools do not allow the first supplier to determine a greenhouse gas emission equivalent of other than the first supplier.

11. The system of claim 9 wherein the first software tools comprise first software tools to receive the first data sufficient to determine what percentage of the first supplier's total usage over a time period is attributable to the client.

12. The system of claim 9 wherein the first software tools comprise first software tools to receive the first data sufficient to determine a greenhouse gas emission equivalent per unit of goods provided to the client by the first supplier.

13. The system of claim 9 wherein the first software tools comprise first software tools to receive the first data sufficient to determine a greenhouse gas emission equivalent per unit of services provided to the client by the first supplier.

14. The system of claim 9 wherein the second software tools comprise second software tools to receive the second data identifying the first supplier's usage of energy resources over a time period.

15. The system of claim 9 wherein the second software tools comprise second software tools to receive the second data identifying the first supplier's usage of material resources over a time period.

16. The system of claim 9 wherein the extent of usage of the first supplier is proposed.

17. The system of claim 9 wherein the extent of usage of the first supplier is actual.

18. A method performed by a client running modeling software that models a greenhouse gas emission equivalent based on a supply of goods or services by a supply chain to the client, the method comprising:

transmitting first data to a server, input by the client, identifying a first supplier and an extent of usage of the first supplier, the server receiving second data input by the first supplier identifying the first supplier's usage of at least one resource and third data input by at least a second supplier identifying the at least the second supplier's usage of at least one resource, the server calculating a value related to a total greenhouse gas emission equivalent by the first supplier and the at least the second supplier attributed to the client's usage of the first supplier and the at least the second supplier, the first supplier and the at least the second supplier being in the supply chain; and the client receiving from the server the value related to the total greenhouse gas emission equivalent by the first supplier and the at least the second supplier for evaluating by the client so that the client can determine a greenhouse gas emission equivalent by the supply chain.

\* \* \* \* \*